Oct. 19, 1954
J. ANDRUS
2,691,858
CUTTING TOOL
Filed Oct. 24, 1951
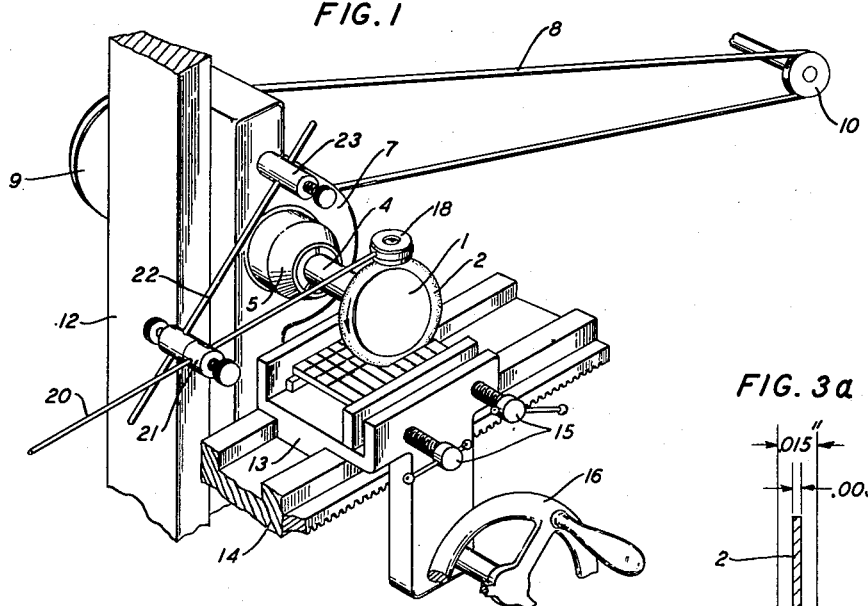
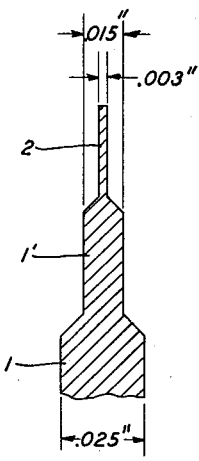
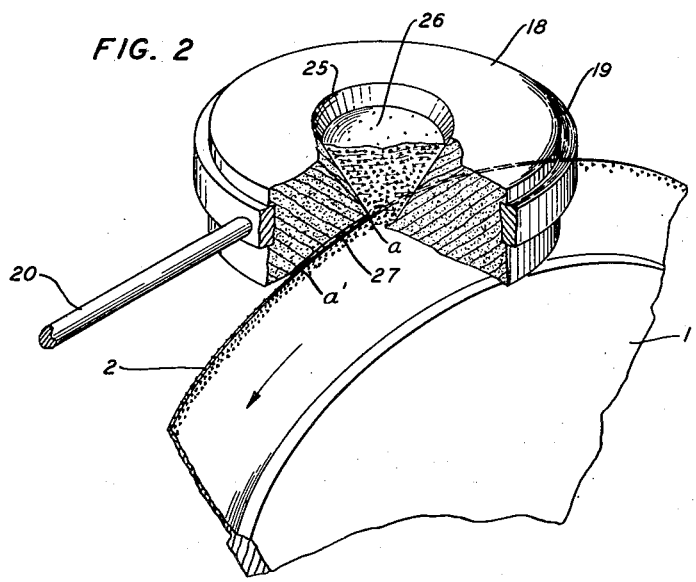
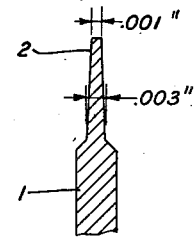
INVENTOR
J. ANDRUS
BY
*N. D. Ewing*
ATTORNEY Patented Oct. 19, 1954

2,691,858

UNITED STATES PATENT OFFICE 2,691,858

CUTTING TOOL

Jules Andrus, Berkeley Heights, N. J., assignor to Bell Telephone Laboratories, Incorporated, New York, N. Y., a corporation of New York Application October 24, 1951, Serial No. 252,817

5 Claims. (Cl. 51—263)

1

This invention relates, in general, to a cutting tool and more particularly to a self-charging saw for cutting thin slits or grooves in hard materials such as quartz, germanium, and ceramics.

The principal object of this invention is to provide a saw adapted to make finer and more accurate cuts than are possible with prior art devices that have comparable durability. A further object is to provide a fine cutting tool which maintains its initial sharpness during cutting operation.

In accordance with the present invention, the aforementioned objects are realized in a saw comprising a thin rotary blade, preferably of cold-rolled steel, and a device for continuously charging the edge and sides of the blade with abrasive, the charging device comprising a body of agate or other dense material that is substantially harder than the material of the blade. The agate is pressed against the edge of the blade so that in normal operation a slot is cut into the agate. Moreover, the agate is provided with an abrasive feed passage so arranged that the abrasive is drawn by the blade into the constriction between the blade and the walls of the slot where it is forced to embed itself in the softer material, viz., that of the blade. Thus, while the saw is cutting material at one point on its periphery, it is sharpening or charging itself at another point.

A particular feature of the present invention is that as the blade gradually cuts its way deeper into the agate, the abrasive-charging constriction is continually maintained, or renewed, notwithstanding the tendency of the sidewalls of the slot in the agate to wear away and open up the constriction.

Other objects, features, and advantages of the present invention will be apparent from a study of the specification hereinafter and the attached drawings of which:

Fig. 1 shows an abrasive saw of the present invention in perspective;

Fig. 2 shows an enlarged view of the charging device and its relation to the saw blade; and Figs. 3A and 3B show alternative shapes to which the blade may be machined.

Referring in detail to Fig. 1 of the drawings, a disc 1, preferably comprising cold-rolled steel, which may be, for example, ¾ of an inch in diameter and 25 mils thick, is machined integrally with a central shaft 4 having a diameter of $\tfrac{3}{16}$ inch. The initial thickness of the cutting portion 2 of the blade, which is of the order of 25 mils, is shaped to its final dimension by a pair of stellite tools which are mounted on either side and

2 are so operated that the edge is precisely cut on both sides simultaneously to the desired thickness which in the present illustrative embodiment may be, for example, of the order of two or three mils.

The shaft 4 is mounted in a collet chuck 5 on the bearing 7 thereby engaging with another shaft which extends through the bearing 7 in driven relation to the pulley wheel 9, which is in turn connected by means of a driving belt 8 to the pulley wheel 10. A conventional electrical motor drives the pulley wheel 10 at such speeds that the shaft 4 may be rotated at from 2,000 to 5,000 revolutions per minute.

The work upon which the cutting tool operates is supported against the lower periphery of the cutting edge 2 by means of a carriage 13 which is slidably mounted in a bed 14, with relation to which it is moved to and fro in a horizontal direction by the crank 16 through the operation of a rack and pinion gearing mechanism (not shown). The work is clamped in position in the carriage 13 by a pair of clamp screws 15. It is apparent that similar conventional mechanisms not shown may be provided for raising and lowering the work vertically, and for moving it horizontally in a direction at right angles to the direction of motion indicated.

The sharpening and charging mechanism of the saw may comprise, for example, a cylindrical piece of agate 18 of the order of a half-inch in diameter and 0.2 of an inch thick, one flat surface of which is pressed against the upper periphery of the cutting blade 2. The agate 18 contains a centrally located conical passage 25 which extends through the agate in an axial direction, tapering from a cross-sectional dimension of, say, 0.12 inch on the upper flat surface to 0.03 inch on the lower flat surface in contact with and centered on the blade 2. The agate member 18 is mounted in a collar 19, which may be bronze, attached to the circular periphery of the cylinder, in such a manner that it may be rotated manually about its own own axis from one position to another. To the collar 19 is rigidly connected an arm 20, which is pivoted on a post 21 in such a manner that the agate member 18 rests on the cutting edge 2 with a pressure equal to its own weight, which may be, for example, of the order of 14 ounces. The post 21 is held in position by another arm 22 fastened to a second post 23.

Within the conical centrally-located opening 25 of the agate member 18 is placed an abrasive mixture comprising, for example, diamond dust and oil. The diamond particles may, for example, have cross-sectional dimensions of the order of 0.2 mils, which is preferably, but not necessarily, the same order of cross-sectional dimension as that of the microscopic pits which may be present in the metallic blade 2. Such pits are normally present in machined cold-rolled steel and are also sometimes found in differently processed steels, and other types of metal. The oil may be any ordinary type of lubricating or vegetable oil. A convenient ratio is two parts of dust to one of oil, providing a mixture of pasty consistency. This mixture is fed down through the opening onto the blade 2, which is pressed against and centered on one of the flat sides of the agate member 18, in such relation as to cut a slot in the agate.

During the operation of the saw the blade is lubricated by a fine grade of lubricating oil or kerosene which is applied simply by immersing the work in oil prior to commencing the cutting operation.

One theory of operation of the self-charging saw is as follows: When the disc 1 is rotated in the direction shown by the arrow, the blade 2, against which the agate member 18 is pressed, cuts a slot 27 in the agate which extends between the lower portion of the conical opening 25 and the outer surface of the agate 18 and barely exceeds the cross-sectional dimension of the cutting edge 2. As the blade passes through the slot 27, particles of diamond abrasive are picked up from the lower portion of the conical opening 25 and pressed into the periphery of the blade and also into the sides to whatever depth the blade extends into the cut. That is, since there is very slight clearance between the blade and the walls of the slot 27, the abrasive particles necessarily embed themselves in the softer material of the blade. This condition is maintained as the saw cuts deeper into the agate. When the blade has penetrated so deeply into the agate that the abrasive particles are embedded as far down as desired on the lateral portions of the blade, the agate can be rotated in the collar 19 to a new position, where the blade begins to make a fresh cut.

Assuming the material of the blade 2 to contain microscopic pits, as described above, it may be theorized that these act as repositories for the abrasive particles, holding them in position on the rotating blade as they enter the constriction formed between the blade 2 and the walls of the slot 27. Hence, when an element of the blade 2 which has passed through the slot 27 arrives at a point beyond the slot 27, the small particles of diamond have been firmly pressed into microscopic pits in the blade, so that a sharpened cutting edge is produced. The blade then rotates to the lower point where it contacts the work, which in this case is assumed, for example, to be a block of germanium which is being cut up into a plurality of transistor blocks. During this operation, the passage of the blade through the work may cause some of the diamond abrasive pieces which have been pressed into its edge to loosen. Thus, upon the next successive rotation the charging process previously described is again repeated. Accordingly, the saw is continuously recharged to renew the sharpness of its edge. Moreover, during each rotation of the blade, sufficient lubricating oil is applied to the blade by contact with the work to insure smooth cutting operation, both in relation to the work and the charging crystal.

Such a saw as described herein has numerous advantages over prior art devices, in that an extremely fine blade is provided which will not wear away or become dull under constant use. Moreover, the disc 1 which is integrally formed with the shaft 4 in such a manner as to be readily detachable from the driving mechanism, may be machined to any desired thickness or shape necessary for the operation to be performed. For example, the blade may be machined in position to an initial thickness of, say, 15 mils, for a first operation, and later cut down to a thickness of, say, 3 mils for a second operation, respectively indicated by 1' and 2, on Fig. 3A.

Another alternative type blade especially adaptable for making fine tapered cuts is indicated in Fig. 3B. In the example indicated, the cross-sectional dimension of the blade 2 is tapered from 3 mils adjacent the broader portion of the blade to 1 mil at the periphery. The radial extent of the actual cutting portion of the blades in each case is determined by the dimensions of the cut to be made, and may vary from a few mils to a tenth of an inch.

The device described has been applied successfully to operations for which no adequate prior art tools have been found. For example, for mounting contact leads in certain types of transistors, the saw of the present invention has been used to cut a groove in germanium 3 mils wide and 1½ mils deep. Also, fine lines on quartz have been made 2 mils wide and 2 mils apart using the saw of the present invention.

The scope of the invention is not to be construed as limited to the particular form or the particular materials herein disclosed as comprising the present illustrative embodiment. For example, bronze has been successfully substituted for steel in the cutting edge, and boron carbide crystals have been used successfully in place of diamond dust as the abrasive in alternative embodiments of the herein described invention.

What is claimed is:

1. A cutting tool comprising in combination a disc mounted for rotation, said disc having a thin cutting edge comprising metal having a large number of microscopic pits in the surface thereof, an element having a hardness and smoothness which exceeds those of the said metal maintained in constant pressure contact against said edge to produce a slot in said element upon rotation of said disc, said element containing a tapered passageway having the small end centered on said slot and the large end opening onto the upper surface of said element for feeding abrasive particles onto said edge during the course of rotation of said edge in said slot whereby said abrasive particles are forced into said pits.

2. A cutting tool in accordance with claim 1 in which said element is agate.

3. A cutting tool comprising in combination a metallic disc mounted for rotation, said disc having a thin cutting edge, an element having a hardness and smoothness which substantially exceeds those of said cutting edge, said element containing a slot within which a portion of said edge is disposed to ride under pressure during rotation of said disc, said element containing a tapered passageway having its small end centered on said slot and extending outwardly therefrom in a radial direction for feeding abrasive particles onto said edge during the course of rotation of said disc.

4. A cutting tool in accordance with claim 3 in which said element comprises agate.

5. A self-charging saw comprising in combination a disc of steel or the like having a fine cutting edge integrally formed with a centrally located axle, driving means connected to said axle for driving said axle in rotation, an element of crystal having a hardness which substantially exceeds the hardness of said cutting edge, supporting means for supporting one face of said element in constant pressure contact with the upper periphery of said edge to produce a cut in said element upon rotation of said disc, said element containing a tapered passageway having its small end centered on said cut and extended in a radial direction to the upper surface of said element for feeding a charge of abrasive particles onto said edge whereby upon rotation said particles are forced into said edge by contact with said element, and means for supporting work in position to be cut by the periphery of said edge upon rotation of said disc.

References Cited in the file of this patent

UNITED STATES PATENTS

| Number | Name | Date |
|---|---|---|
| 341,867 | Andrews | May 18, 1886 |
| 2,279,979 | Gillich | Apr. 14, 1942 |
| 2,293,238 | Bond | Aug. 18, 1942 |
| 2,337,018 | Hillix et al. | Dec. 14, 1943 |